(12) United States Patent
Yao et al.

(10) Patent No.: US 7,023,663 B2
(45) Date of Patent: Apr. 4, 2006

(54) METHOD AND APPARATUS FOR IMPROVED ATTACHMENT OF A MICRO-ACTUATOR TO A SLIDER DEVICE

(75) Inventors: Ming Gao Yao, Dongguan (CN); Masashi Shiraishi, Dongguan (CN)

(73) Assignee: SAE Magnetice (H.K.) Ltd., Kwai Chung (HK)

( * ) Notice: Subject to any disclaimer, the term of this patent is extended or adjusted under 35 U.S.C. 154(b) by 318 days.

(21) Appl. No.: 10/636,137

(22) Filed: Aug. 6, 2003

(65) Prior Publication Data

US 2004/0027722 A1 Feb. 12, 2004

Related U.S. Application Data

(62) Division of application No. 10/075,742, filed on Feb. 13, 2002, now Pat. No. 6,751,069.

(30) Foreign Application Priority Data

Mar. 11, 2001 (CN) .............................. PCT/CN01/01527

(51) Int. Cl.
*G11B 5/596* (2006.01)

(52) U.S. Cl. .................. 360/234.6; 360/294.4
(58) Field of Classification Search .............. 360/234.6, 360/294.1, 294.3, 294.4, 234.3
See application file for complete search history.

(56) References Cited

U.S. PATENT DOCUMENTS

| | | | |
|---|---|---|---|
| 5,325,463 A | 6/1994 | Murata et al. | 704/266 |
| 5,673,161 A | 9/1997 | Yanagisawa et al. | 360/246.2 |
| 6,002,549 A | 12/1999 | Berman et al. | 360/294.4 |
| 6,198,606 B1 | 3/2001 | Boutaghou et al. | 360/294.3 |
| 6,246,552 B1 | 6/2001 | Soeno et al. | 360/294.4 |
| 6,414,823 B1 | 7/2002 | Crane et al. | 360/294.5 |
| 6,574,077 B1 | 6/2003 | Crane et al. | 360/294.3 |
| 6,590,747 B1 | 7/2003 | Boutaghou et al. | 360/294.3 |
| 6,611,399 B1 | 8/2003 | Mei et al. | 360/234.7 |
| 6,731,462 B1 * | 5/2004 | Furuichi et al. | 360/234.6 |
| 6,771,467 B1 * | 8/2004 | Kasajima et al. | 360/234.6 |
| 2002/0141117 A1 | 10/2002 | Kasajima et al. | 360/294.4 |
| 2003/0053264 A1 | 3/2003 | Chen et al. | 360/294.4 |
| 2003/0095361 A1 | 5/2003 | Shimanouchi et al. | 360/294.4 |
| 2003/0147181 A1 | 8/2003 | Shiraishi et al. | 360/294.4 |
| 2003/0147182 A1 | 8/2003 | Yao et al. | 360/294.4 |

FOREIGN PATENT DOCUMENTS

| | | |
|---|---|---|
| JP | 5325463 A2 | 12/1993 |
| JP | 8249849 A2 | 9/1996 |

* cited by examiner

*Primary Examiner*—Jefferson Evans
(74) *Attorney, Agent, or Firm*—Kenyon & Kenyon (57) ABSTRACT

A system and method for improving the process of attaching a hard disk micro-actuator to a slider device with a bonding agent such as epoxy, the slider having design characteristics to avoid various problems associated with bonding the components with a bonding agent such as epoxy.

17 Claims, 12 Drawing Sheets

METHOD AND APPARATUS FOR IMPROVED ATTACHMENT OF A MICRO-ACTUATOR TO A SLIDER DEVICE

RELATED APPLICATION

This application is a Divisional of patent application Ser. No. 10/075,742, filed on Feb. 13, 2002 now U.S. Pat. No. 6,751,069, Publication Number 2004/0027722, dated Feb. 12, 2004.

BACKGROUND INFORMATION

The present invention relates to magnetic hard disk drives. More specifically, the present invention relates to a system for attachment of a hard disk micro-actuator to a slider device.

Figure 1:
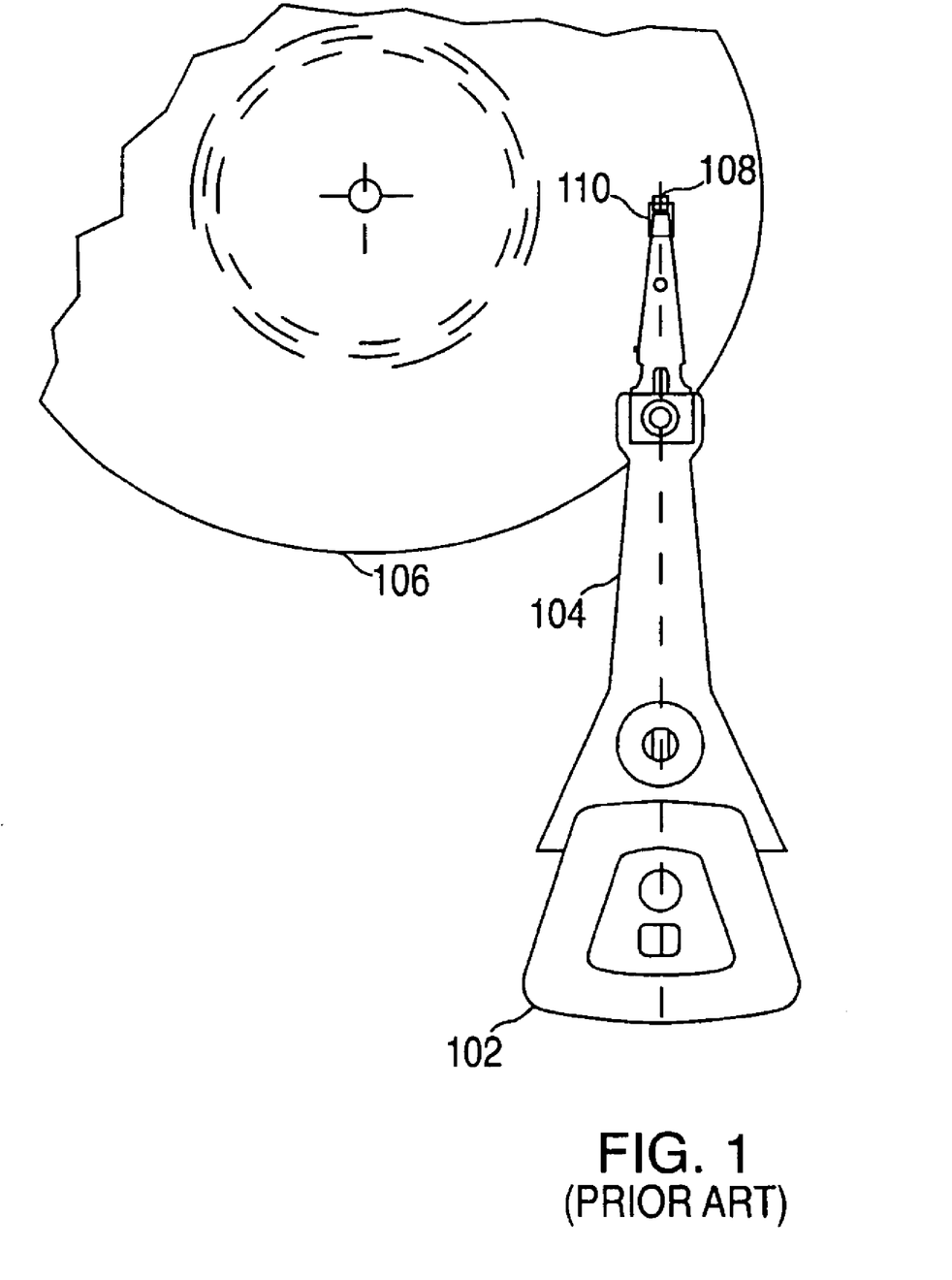
FIG. 1 provides an illustration of a drive arm configured to read from and write to a magnetic hard disk as used in the art.

In the art today, different methods are utilized to improve recording density of hard disk drives. FIG. 1 provides an illustration of a typical drive arm configured to read from and write to a magnetic hard disk. Typically, voice-coil motors (VCM) 102 are used for controlling a hard drive's arm 104 motion across a magnetic hard disk 106. Because of the inherent tolerance (dynamic play) that exists in the placement of a recording head 108 by a VCM 102 alone, micro-actuators 110 are now being utilized to 'fine-tune' head 108 placement, as is described in U.S. Pat. No. 6,198,606. A VCM 102 is utilized for course adjustment and the micro-actuator then corrects the placement on a much smaller scale to compensate for the VCM's 102 (with the arm 104) tolerance. This enables a smaller recordable track width, increasing the 'tracks per inch' (TPI) value of the hard drive (increased drive density).

Figure 2:
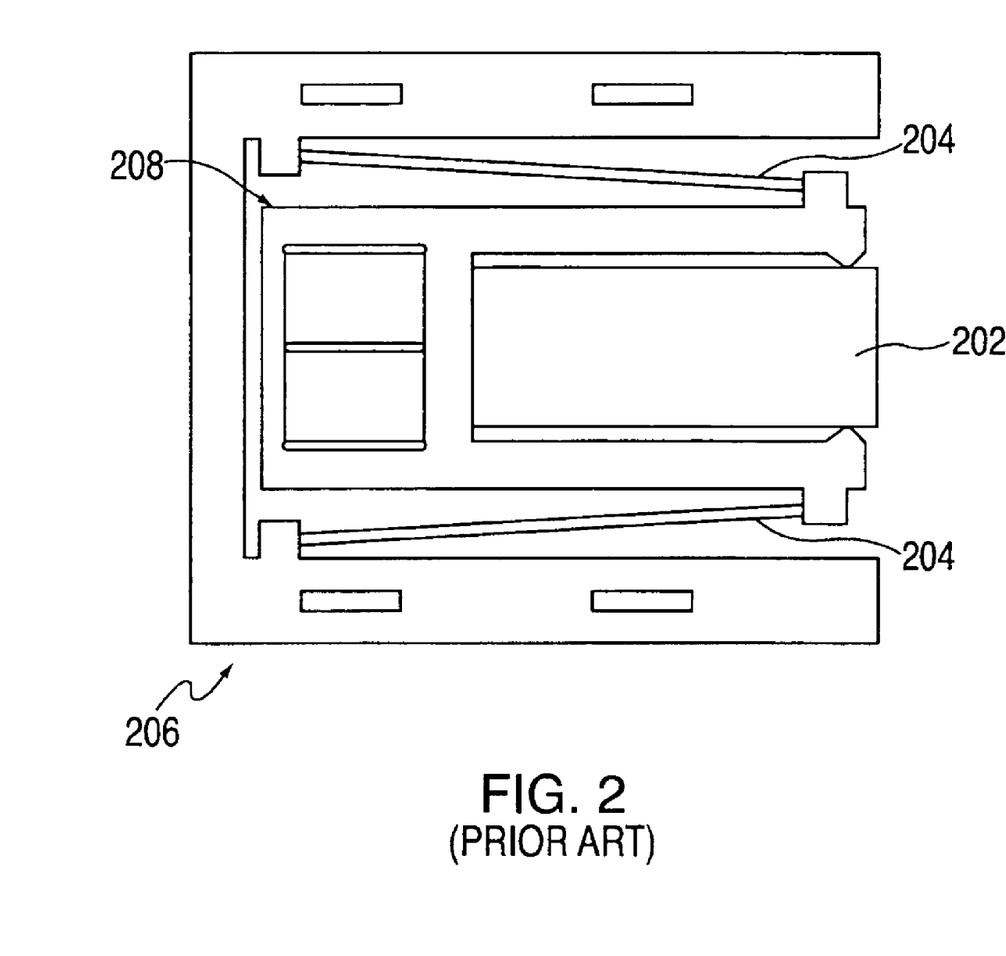
FIG. 2 provides an illustration of a micro-actuator as used in the art.

FIG. 2 provides an illustration of a micro-actuator as used in the art. Typically, a slider 202 (containing a read/write magnetic head; not shown) is utilized for maintaining a prescribed flying height above the disk surface 106 (See FIG. 1). Micro-actuators may have flexible beams 204 connecting a support device 206 to a slider containment unit 208 enabling slider 202 motion independent of the drive arm 104 (See FIG. 1). An electromagnetic assembly or an electromagnetic/ferromagnetic assembly (not shown) may be utilized to provide minute adjustments in orientation/location of the slider/head 202 with respect to the arm 104 (See FIG. 1).

Attachment of a slider assembly to a micro-actuator can be difficult and/or expensive due to the dimensions within which it must occur. Bonding means must be very precise. It is therefore desirable to have a system for attachment of a hard disk micro-actuator to a slider device that improves the precision and consistency of slider bonding operations.

DETAILED DESCRIPTION

Figure 3:
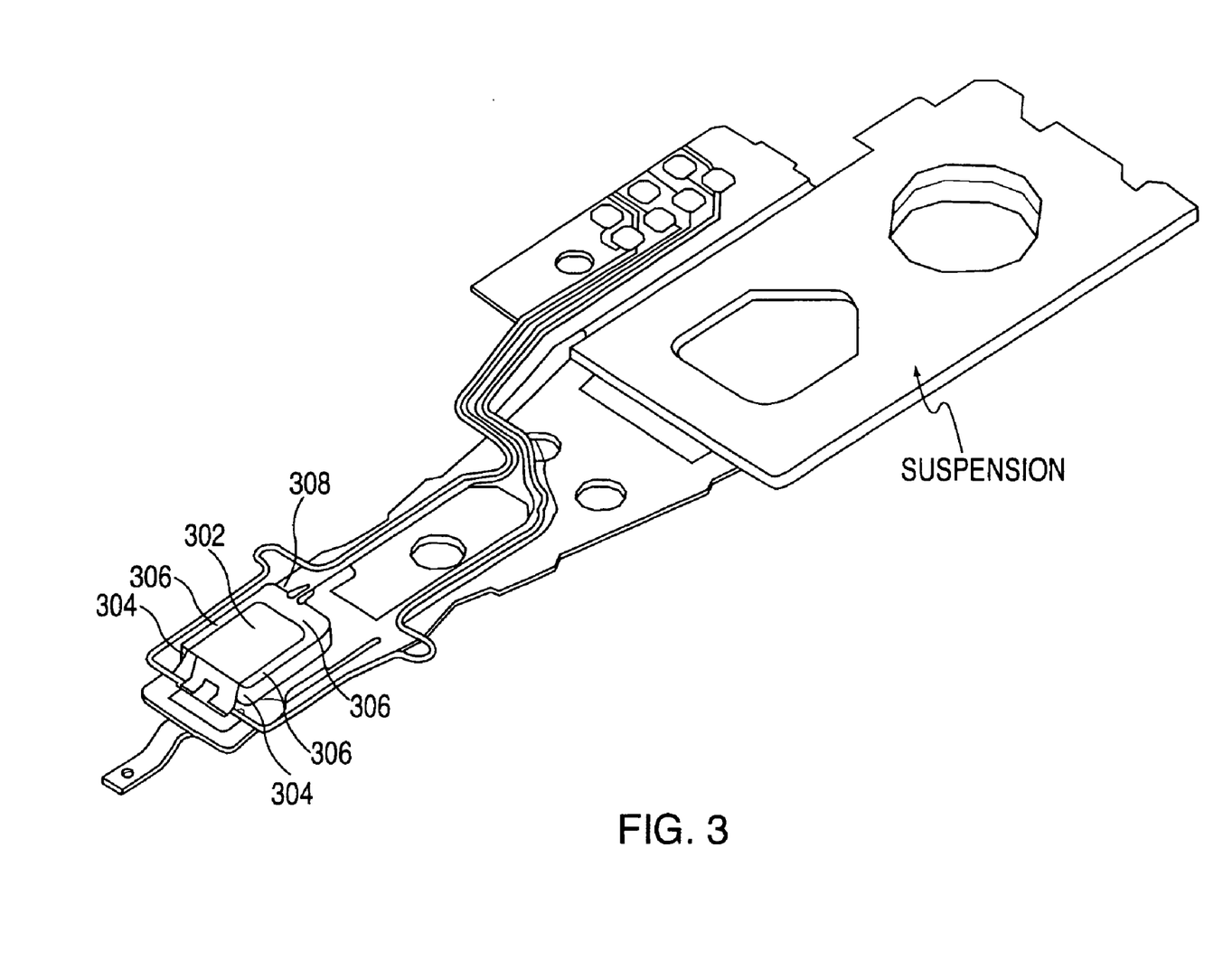
FIG. 3 describes a hard disk drive head gimbal assembly (HGA) with a 'U'-shaped micro-actuator under principles of the present invention.

Illustrated in an upside-down orientation, FIG. 3 describes a hard disk drive head gimbal assembly (HGA) with a 'U'-shaped micro-actuator under principles of the present invention. In one embodiment, a slider 302 is bonded at two points 304 to a 'U'-shaped micro-actuator 306. Further, in an embodiment, the 'U'-shaped micro-actuator has a piezoelectric PZT (Lead Zirconate Titanate) beam (arm) 306 on each side of a Zirconia support frame (actuator base) 308.

Figure 4:
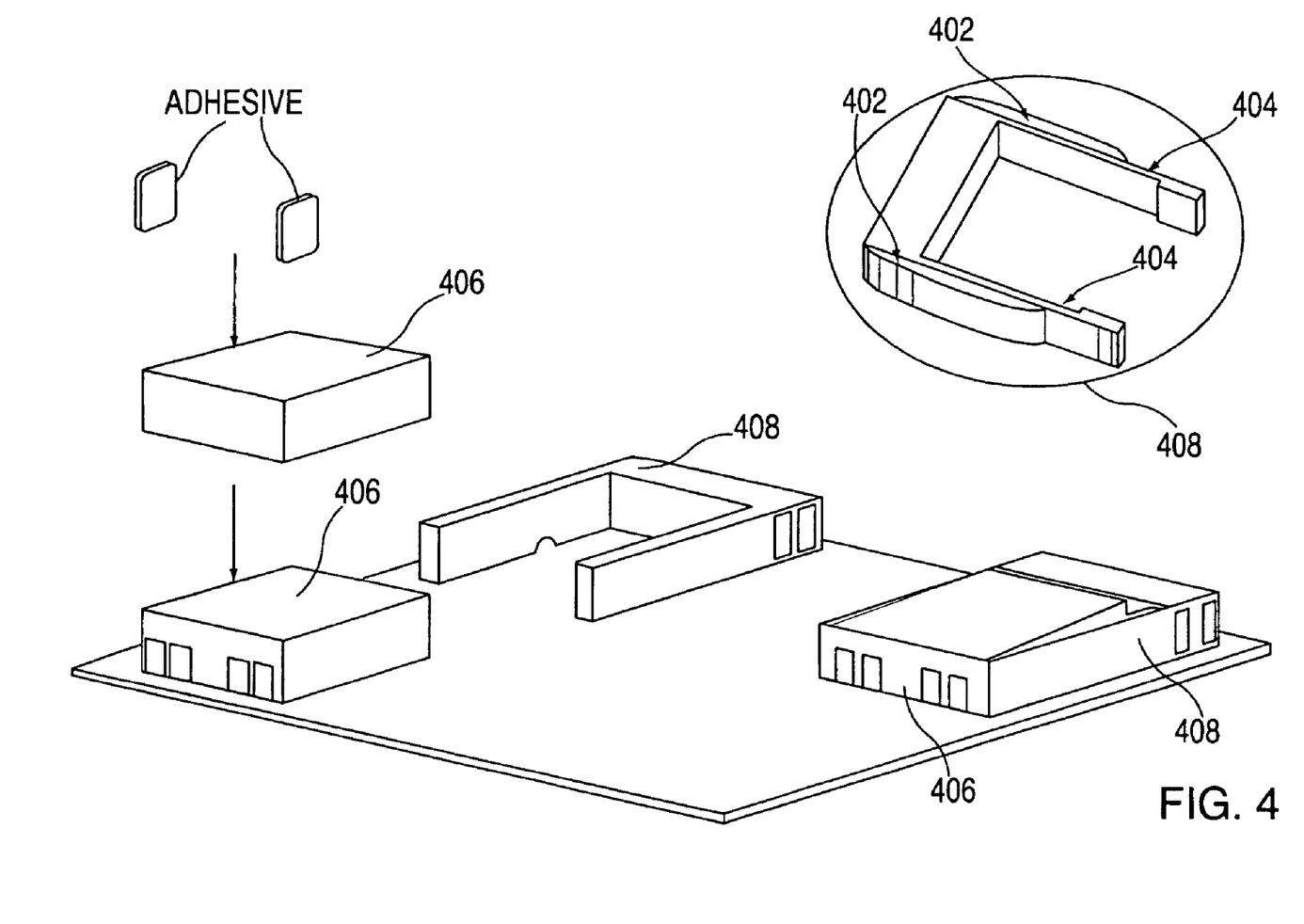
FIG. 4 provides an exploded, detailed illustration of a slider with a 'U'-shaped micro-actuator under principles of the present invention.

FIG. 4 provides an exploded, detailed illustration of a slider with a 'U'-shaped micro-actuator under principles of the present invention. PZT material has an anisotropic structure whereby the charge separation between the positive and negative ions provides for electric dipole behavior. When a potential is applied across a poled piezoelectric material, Weiss domains increase their alignment proportional to the voltage, resulting in structural deformation (i.e. regional expansion/contraction) of the PZT material. As the PZT structures 402 bend (in unison), the Zirconia arms 404, which are bonded to the PZT structures 402, bend also, causing the slider 406 to adjust its position in relation to the micro-actuator 408 (for magnetic head fine adjustments).

Figure 5A:
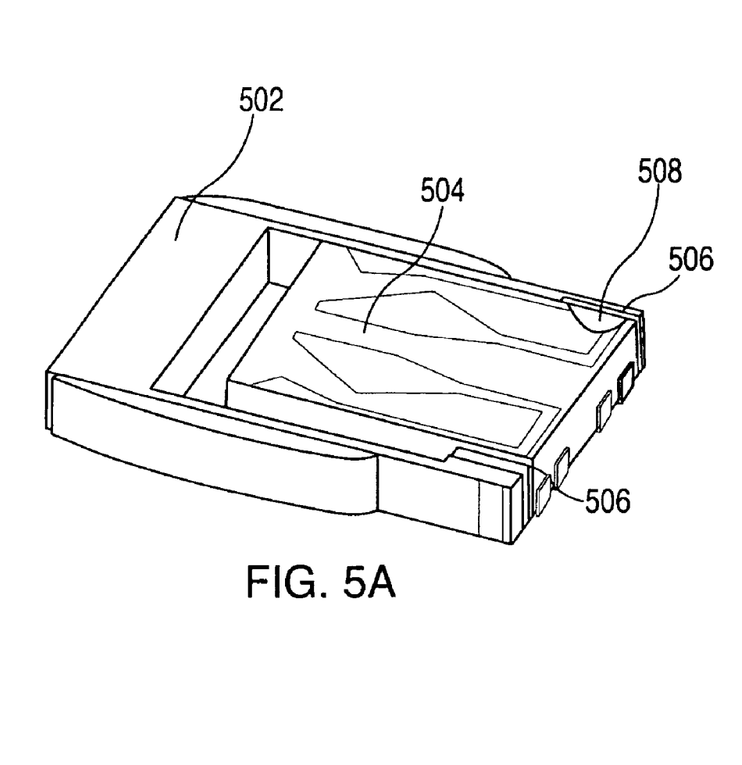
FIGS. 5a and 5b provide an illustration of two different problems involved with the process of bonding a slider to a 'U'-shaped micro-actuator by a bonding agent such as epoxy.
Figure 5B:
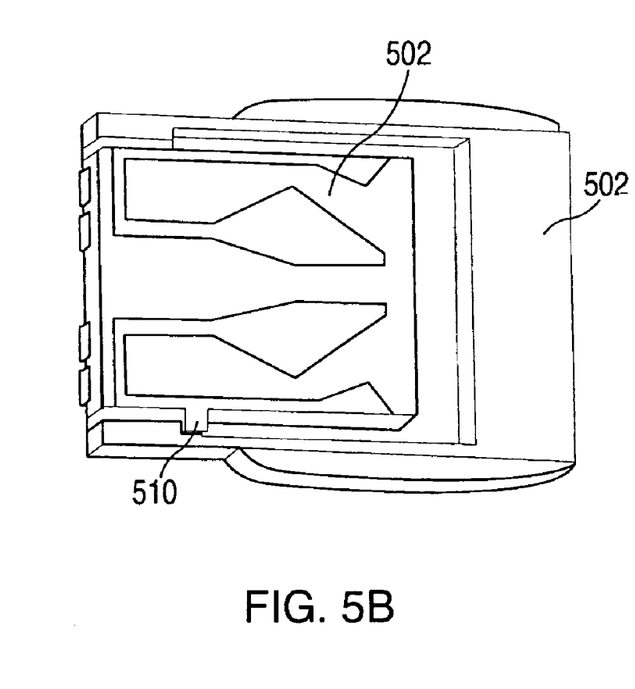

FIG. 5 provides an illustration of two different problems involved with the process of bonding a slider to a 'U'-shaped micro-actuator by a bonding agent such as epoxy. A 'U'-shaped micro-actuator 502 is attached to a slider device 504 at two points 506 by epoxy. FIG. 5a illustrates a problem involving an overflow of epoxy during the bonding process. While the epoxy is curing, it is possible for an amount of epoxy to overflow 508 onto the slider surface. Because of the dimensional scale of the device, it is difficult to consistently apply a precise amount of epoxy (or other bonding agent). If a surplus of epoxy is provided, it may overflow 506 onto the surface of the slider 504. This can affect the flying height of the slider 504, which could cause magnetic interaction outside of the desired track (too high) or cause disk surface damage (too low). FIG. 5b provides a description of a problem with epoxy overflowing beyond the desired contact patch 506 to a location 510 in which it can bind and restrict slider 504 motion with respect to the micro-actuator 502 or it can cause slider 502 motion asymmetry (with respect to the micro-actuator).

Figure 6A:
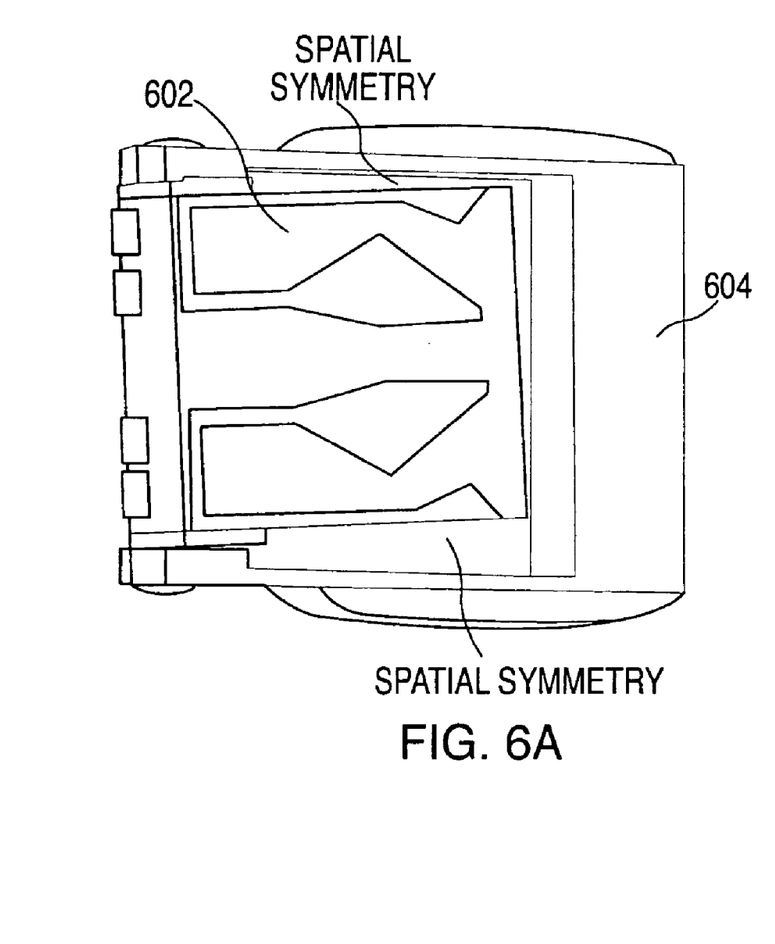
FIGS. 6a and 6b provide an illustration of two other problems involved with utilizing a bonding agent such as epoxy.
Figure 6B:
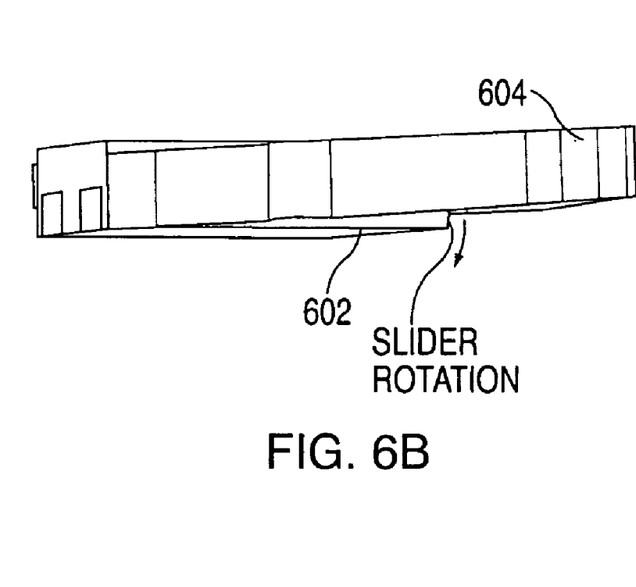

FIG. 6 provides an illustration of two other problems involved with utilizing a bonding agent such as epoxy. As seen in FIG. 6a, the slider 602 may shift with respect to the micro-actuator 604 while the epoxy is curing, causing spatial asymmetry of the slider 602 with respect to the micro-actuator 604. This can cause problems during operation such as limiting the slider's 602 range of motion with respect to the micro-actuator 604. Similarly, as seen in FIG. 6b, the slider 602 may shift with respect to the micro-actuator 604 while the epoxy is curing, causing slider 602 rotation with respect to the micro-actuator 604. The resulting slider 602 orientation may adversely affect slider 602 flying height as well as flight control. Further, it may cause the slider 602 to come into contact with the suspension during slider 602 operation.

Figure 7A:
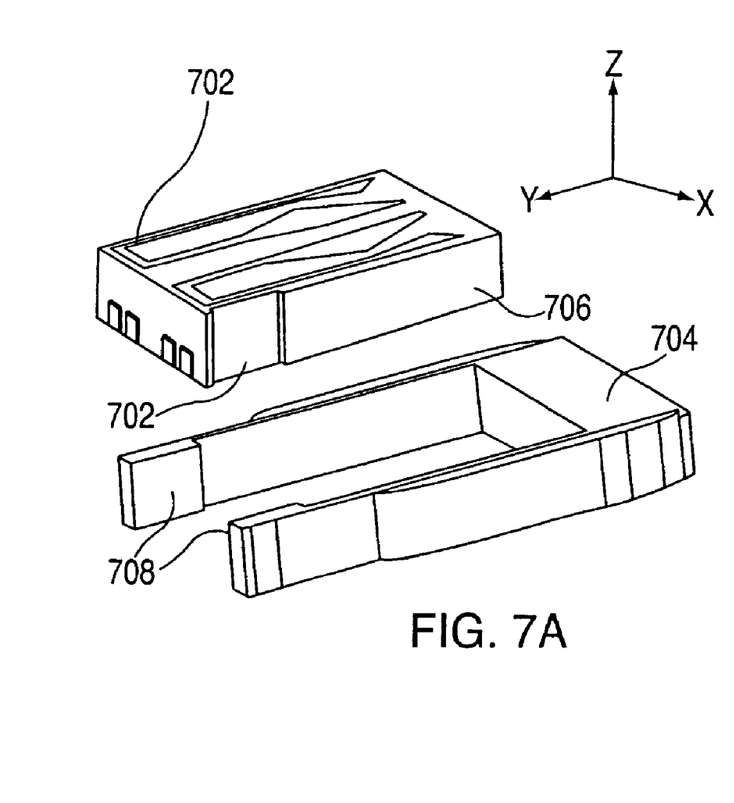
FIGS. 7a and 7b provide design improvements to correct the slider asymmetry and rotation problems under principles of the present invention.
Figure 7B:
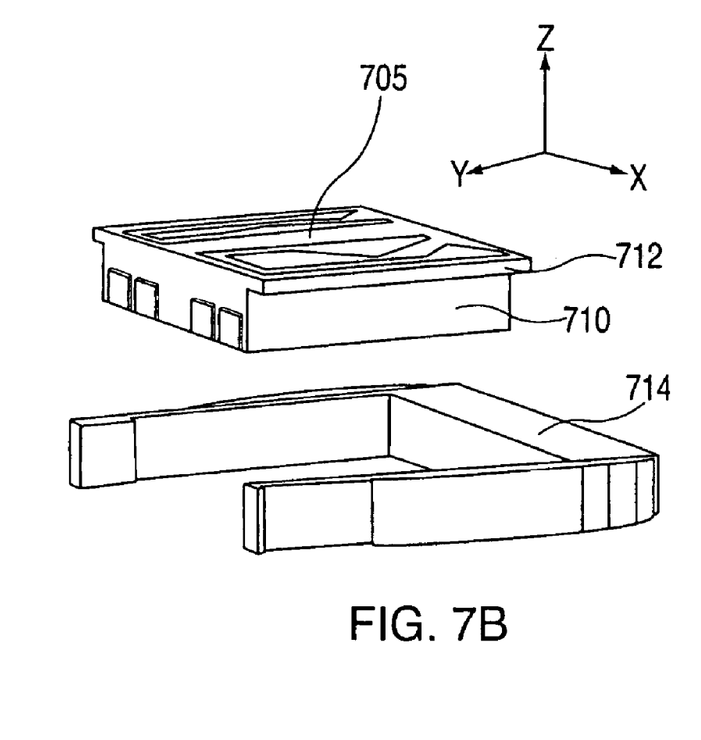

FIG. 7 illustrates design improvements to correct the slider asymmetry/rotation problem illustrated in FIG. 6 under principles of the present invention. Design 1, as depicted in FIG. 7a, prevents the rotation and asymmetry problem. In one embodiment of the present invention, a recessed area 702 is formed in opposite sides of the slider 706, which accepts a raised area 708 on each arm of the micro-actuator 704, thus preventing rotational motion with respect to the micro-actuator in either the Z-X plane or Z-Y plane. Design 2, as depicted in FIG. 7b, prevents the rotation problem. In one embodiment, a step 710 is created in opposite sides of the slider 705, which leaves a lip 712 on each side of the slider 705 that overlaps the arms of the micro-actuator 714, thus preventing rotational motion with respect to the micro-actuator in the Z-Y plane.

Figures 8A, 8B:
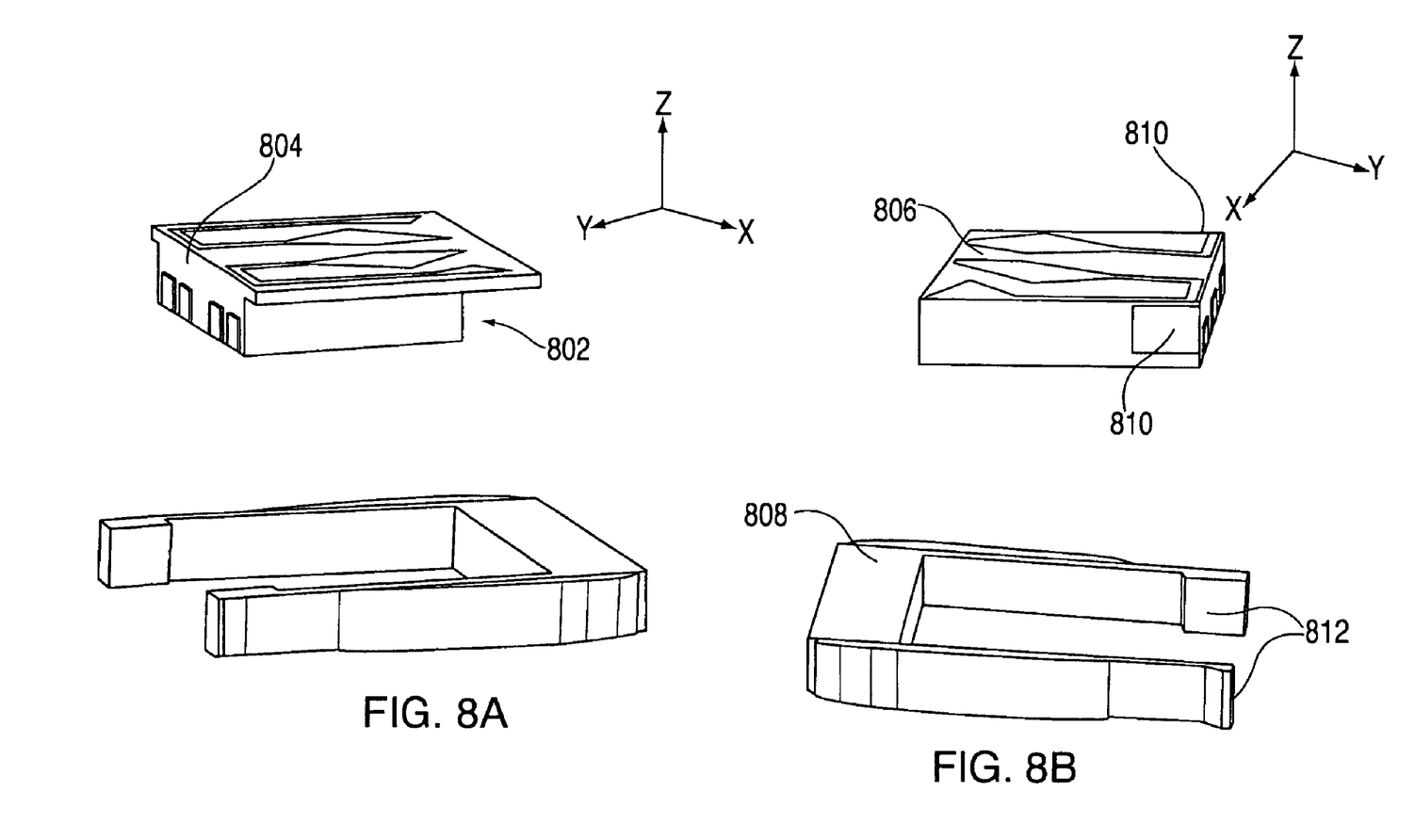
FIGS. 8a and 8b provide design improvements to correct the rotation problem as well as the overflow problem under principles of the present invention.

FIG. 8 illustrates further design improvements to correct the rotation problem as well as the overflow problem associated with slider bondage by agents such as epoxy under principles of the present invention. Design 3, as depicted in FIG. 8a, prevents the rotation problem in the same manner as Design 2 (See FIG. 7b). Further, in one embodiment, an additional step 802 is created in the leading edge of the slider 804, which provides slider 804 weight savings, reducing inertial forces and thus improving responsiveness as well as accuracy.

Design 4, as depicted in FIG. 8b, prevents the epoxy overflow problems illustrated in FIGS. 5a and 5b. As stated previously, the dimensional scale of the slider 806 and micro-actuator 808 makes it difficult to consistently apply precise amounts of epoxy (or other bonding agent). If a surplus of epoxy is provided, it may overflow onto the surface of the slider during curing (See FIG. 5). In one embodiment of the present invention, a recessed area 810 of decreasing depth in the 'Z' direction is created on either side of the slider 806, yielding a partial cleft between the slider 806 and the micro-actuator 808 when placed together. The partial cleft 810 prevents epoxy from being squeezed out onto the slider surface 806. The raised area 812 of each micro-actuator 808 arm cannot enter the partial cleft because of its decreasing depth in the 'Z' direction. In addition, in an embodiment the increased room for epoxy makes a stronger bond possible.

Figure 9:
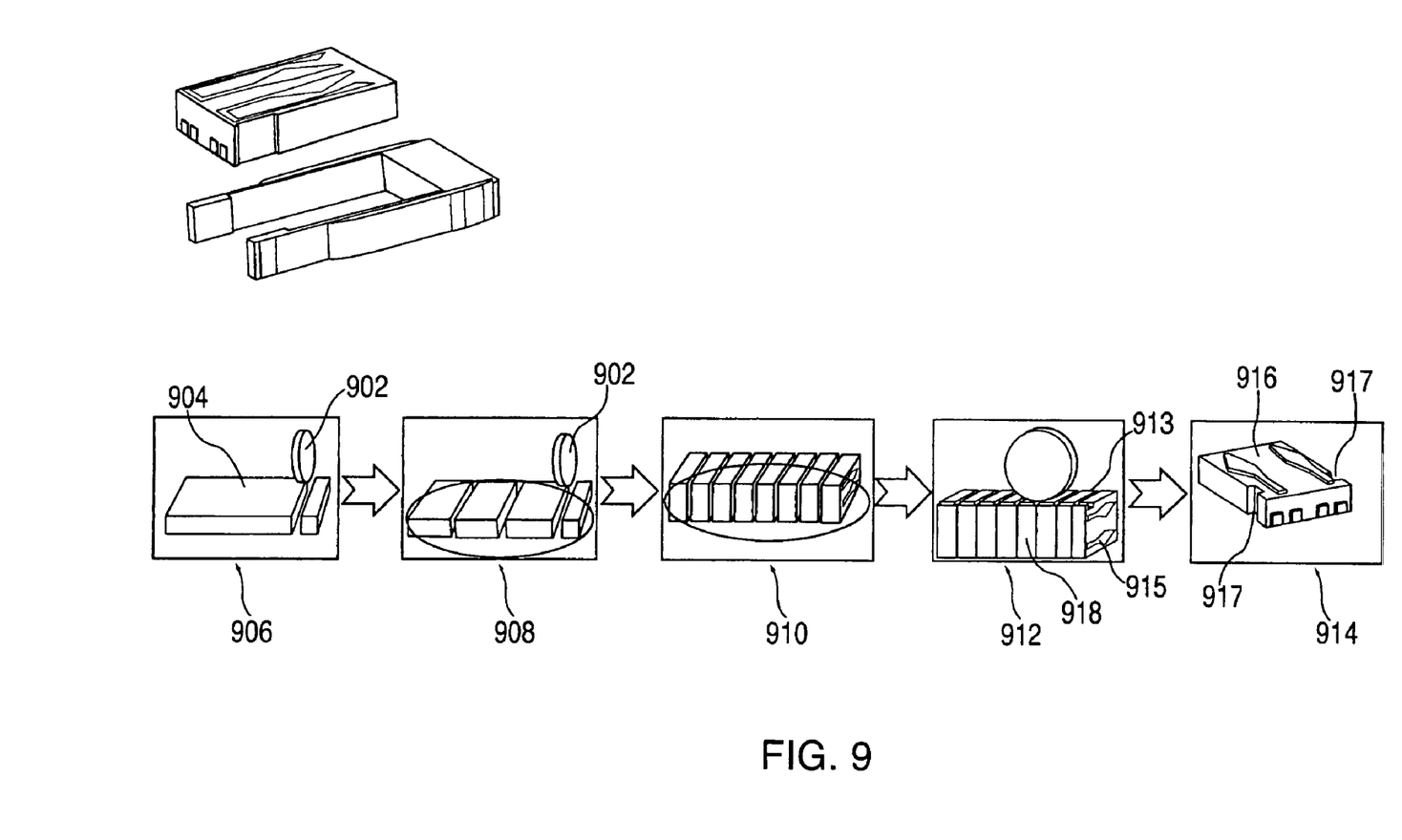
FIG. 9 illustrates the fabrication of a first slider design under principles of the present invention.

FIG. 9 illustrates the fabrication of Design 1 under principles of the present invention. In one embodiment, a cutting wheel 902 is utilized to cut a row bar of slider material 904. The bar 904 is cut 906 in a direction perpendicular to the length (axis) of the bar 904. In an embodiment, this process is repeated 908 and the individual sub-bars are re-joined 910 by a bonding agent. In one embodiment, a shallow groove 913 is cut into one side of the re-joined bar 918, and then into the other side 915 of the bar 918 lengthwise. Next, individual sliders 916 are yielded by separating the sub-bars (from the bar 918), each slider 916 having the appropriately recessed plane 917 on each side for joinder with a 'U'-shaped mico-actuator (not shown).

Figure 10:
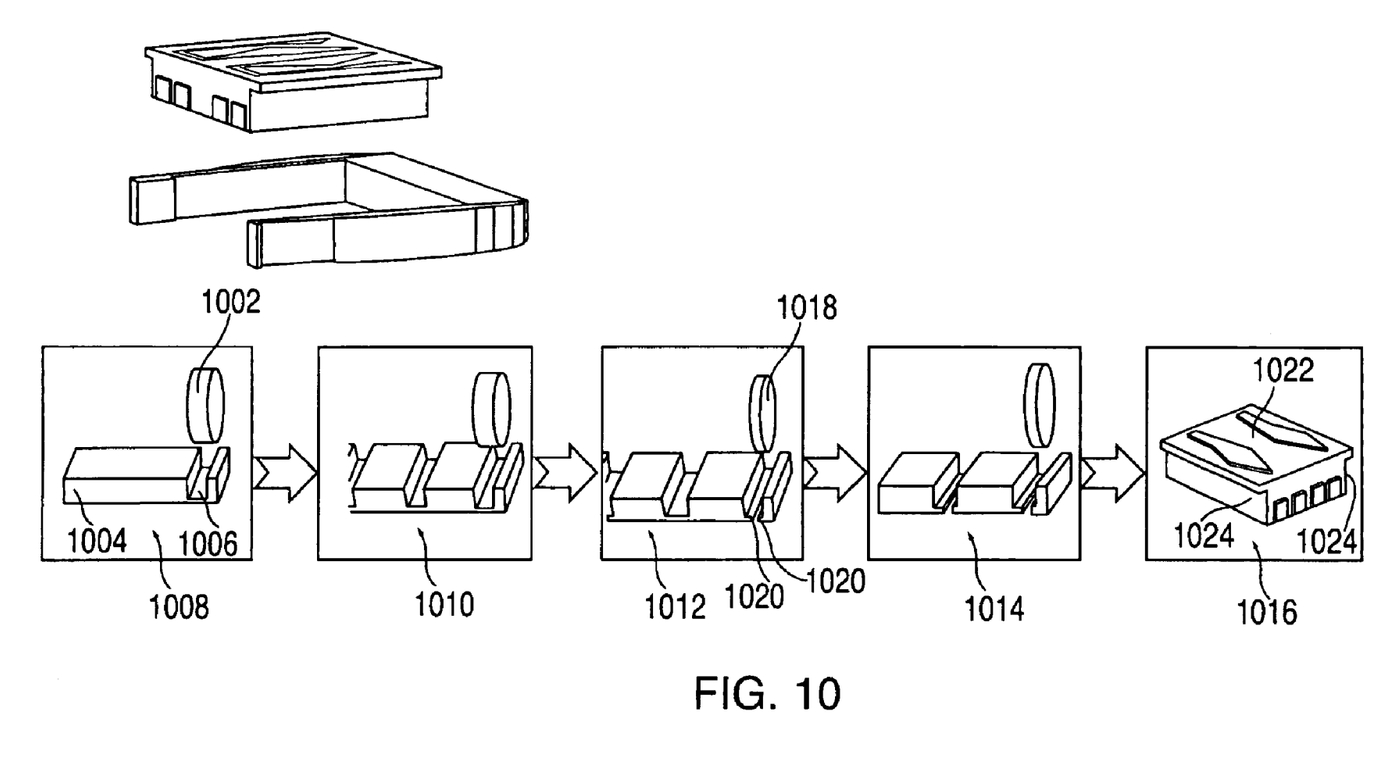
FIG. 10 illustrates the fabrication of a second slider design under principles of the present invention.

FIG. 10 illustrates the fabrication of Design 2 under principles of the present invention. In one embodiment, a cutting wheel 1002 is utilized to cut 1008 a groove 1006 in a row bar of slider material 1004. The bar 1004 is cut to a prescribed depth in a direction perpendicular to the length (axis) of the bar 1004, yielding said groove 1006. The process is repeated 1010 with a prescribed separation between grooves. In an embodiment, the bar is next cut completely through 1012 with a thinner cutting wheel 1018, yielding steps 1020 on each separated unit. This process is repeated 1014, yielding 1016 individual sliders 1022, having steps 1024 on each side.

Figure 11:
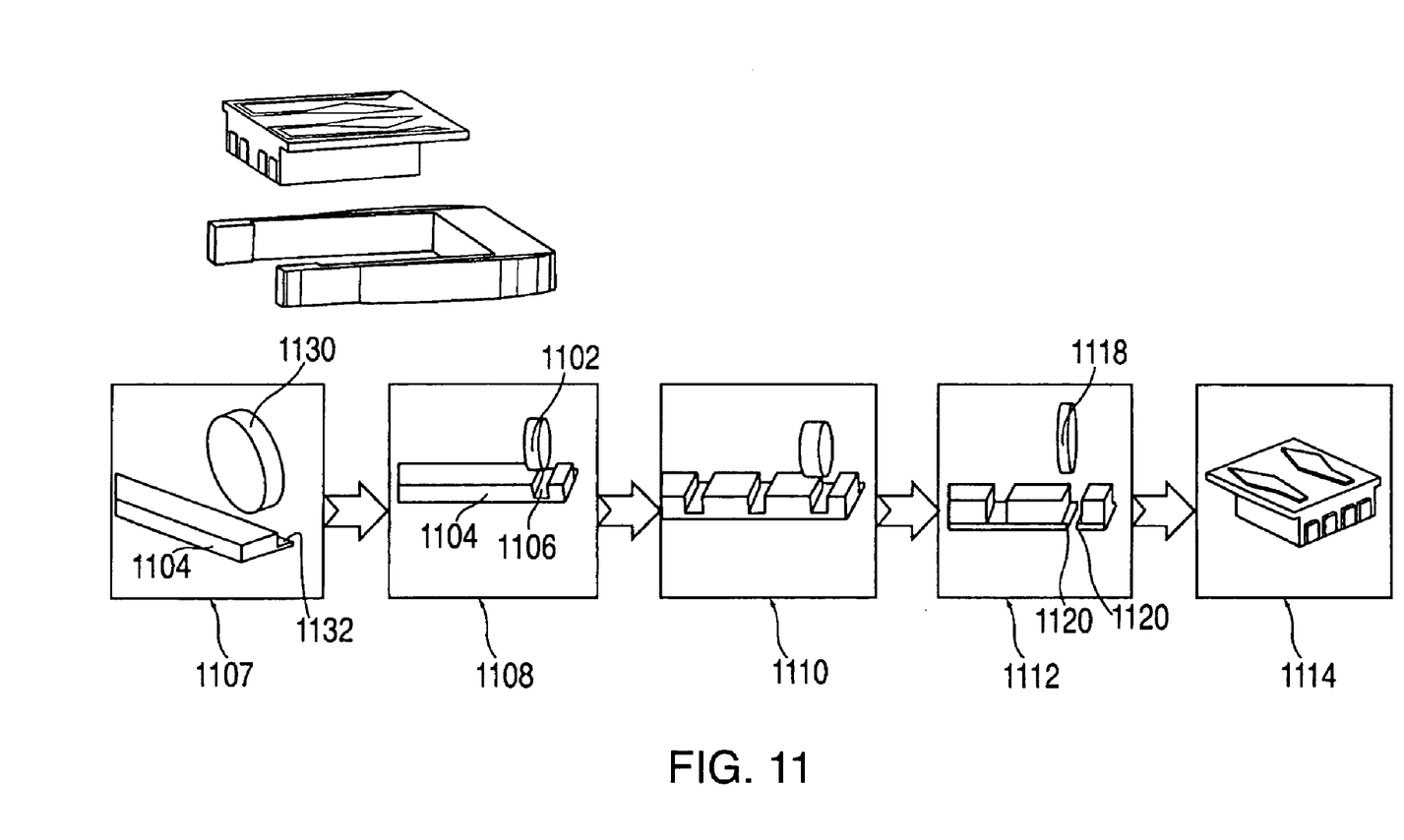
FIG. 11 illustrates the fabrication of a third slider design under principles of the present invention.

FIG. 11 illustrates the fabrication of Design 3 under principles of the present invention. In one embodiment, a cutting wheel 1130 is utilized to cut 1107 a step 1132 of a prescribed depth into a row bar 1104. Next, similar to the manufacturing process of Design 2, a cutting wheel 1102 is utilized to cut 1108 a groove 1106 in the bar 1104. The process is repeated 1110 with a prescribed separation between grooves. In an embodiment, the bar is next cut completely through 1112 with a thinner cutting wheel 1118, yielding steps 1120 on each separated unit. This process is repeated, yielding 1114 individual sliders 1122, having steps on three sides.

Figure 12:
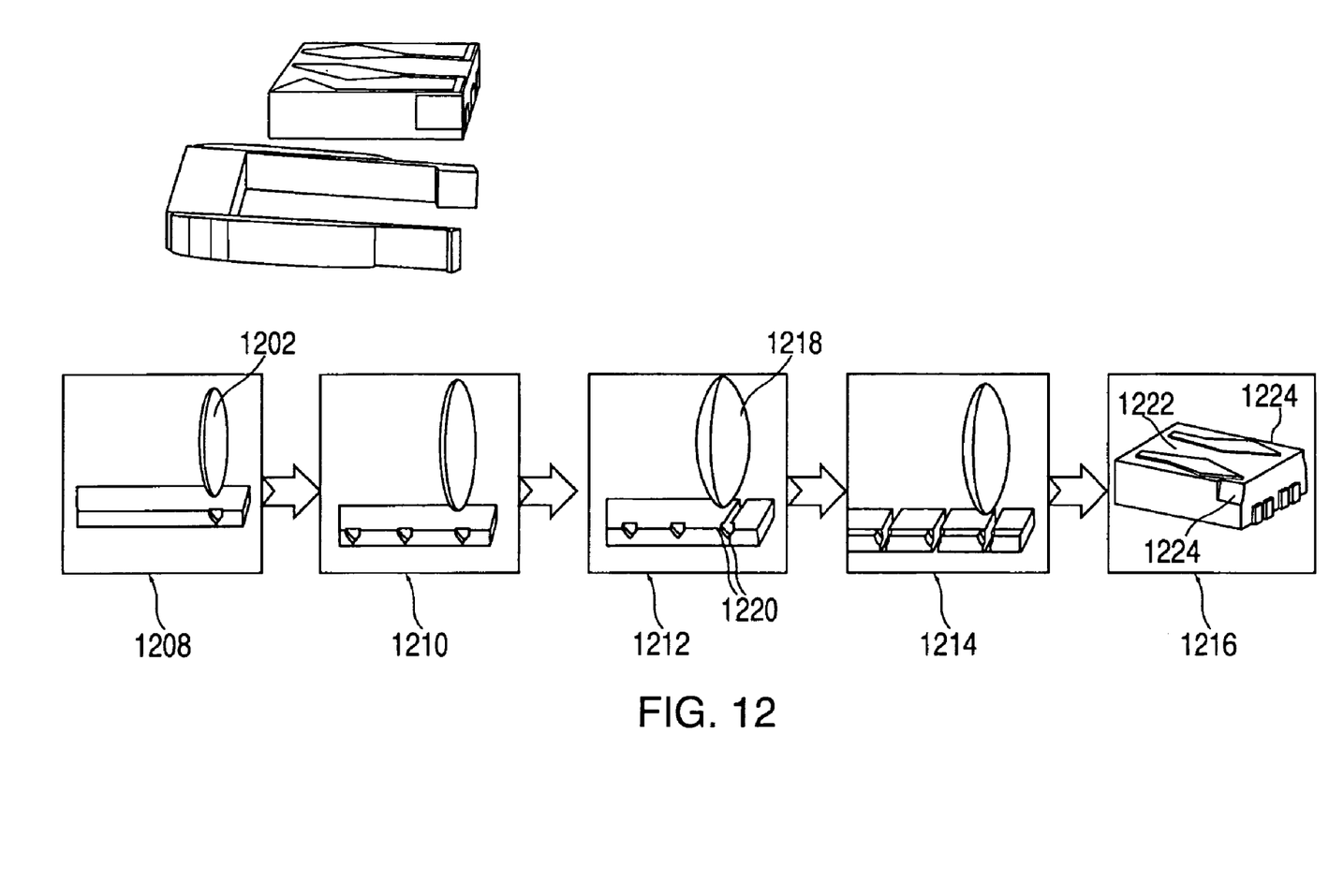
FIG. 12 illustrates the fabrication of a fourth slider design under principles of the present invention.

FIG. 12 illustrates the fabrication of Design 4 under principles of the present invention. In one embodiment, a cutting wheel 1202 with a rounded edge is utilized to cut 1208 a decreasing-radius slit 1206 in a row bar 1204. The bar 1204 is cut to a prescribed depth and for a prescribed distance in a direction perpendicular to the length (axis) of the bar 1204, yielding this slit 1206. The process is repeated 1210 with a prescribed separation between slits. In an embodiment, the bar is next cut completely through 1212 with a thinner cutting wheel 1018, yielding recessed areas (planes) 1220 of decreasing depth on each separated unit. This process is repeated 1214, yielding 1216 individual sliders 1222, having recessed areas 1224 on each side.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A system to join an actuator element to a slider element comprising:

a slider element adapted to be coupled to an actuator element having a generally 'U'-shaped structure, the 'U'-shaped structure being formed by at least a first arm joined at one end to an actuator base and a second arm joined at one end to said actuator base, said first arm having a first raised portion of a first contour and said second arm having a second raised portion of a second contour generally opposing in direction and generally parallel to said first raised portion of said first contour;

said slider element having a first surface with a first recessed portion contoured to accept, for non-rotatable coupling, said first raised portion and a second surface with a second recessed portion contoured to accept, for non-rotatable coupling, said second raised portion; wherein said first raised portion is to bond within said first recessed portion by a bonding agent; and said second raised portion is to bond within said second recessed portion by said bonding agent.

2. The system of claim 1, wherein the actuator element is a micro-actuator and the slider element is a side step slider.

3. The system of claim 2, wherein the micro-actuator is a piezoelectric micro-actuator.

4. The system of claim 3, wherein the bonding agent is epoxy.

5. The system of claim 4, wherein the contours of said first raised portion with said first recessed portion and the contours of said second raised portion with said second recessed portion prevent rotational movement of the slider during a curing process of said epoxy.

6. A system to join an actuator element to a slider element comprising:

a slider element adapted to be coupled to an actuator element having a generally 'U'-shaped structure, the 'U'-shaped structure being formed by at least a first arm joined at one end to an actuator base and a second arm joined at one end to said actuator base and generally parallel to said first arm;

said slider element having a first recessed planar surface forming a first step and a second recessed planar surface forming a second step generally parallel and generally opposite in direction from the first step to accept for non-rotatable coupling said actuator, the first step accepting the first arm and the second step accepting the second arm; wherein said first arm is to bond within said first step by a bonding agent; and said second arm is to bond within said second step by said bonding agent.

7. The system of claim 6, wherein the actuator element is a micro-actuator and the slider element is a side step slider.

8. The system of claim 7, wherein the micro-actuator is a piezoelectric micro-actuator.

9. The system of claim 8, wherein the bonding agent is epoxy.

10. The system of claim 9, wherein the first step accepts the first arm and the second step accepts the second arm to prevent rotational movement of the slider during a curing process of said epoxy.

11. The system of claim 10, wherein said slider has a third recessed planar surface forming a third step that is generally perpendicular to the first and second steps.

12. The system of claim 11, wherein said slider has said third recessed planar surface forming said third step to reduce slider weight.

13. A system to join an actuator element to a slider element comprising:

a slider element adapted to be coupled to an actuator element having a generally 'U'-shaped structure, the 'U'-shaped structure being formed by at least a first arm joined at one end to an actuator base and a second arm joined at one end to said actuator base, said first arm having a first bonding surface and said second arm having a second bonding surface that is generally opposing in direction and generally parallel to said first bonding surface;

said slider element having a first bonding surface with a first recessed portion contoured to partially butt said first arm bonding surface and to provide a partial cleft with said first arm bonding surface; wherein said first slider bonding surface is to bond with said first arm bonding surface; and said second slider bonding surface is to bond with said second arm bonding surface.

14. The system of claim 13, wherein the actuator element is a micro-actuator and the slider element is a side step slider.

15. The system of claim 14, wherein the micro-actuator is a piezoelectric micro-actuator.

16. The system of claim 15, wherein the bonding agent is epoxy.

17. The system of claim 16, wherein said first slider bonding surface partially butts said first arm bonding surface, providing said partial cleft, and said second slider bonding surface partially butts said second arm bonding surface, providing said partial cleft, to prevent epoxy overflow.

* * * * *